United States Patent Office 3,514,562
Patented May 26, 1970

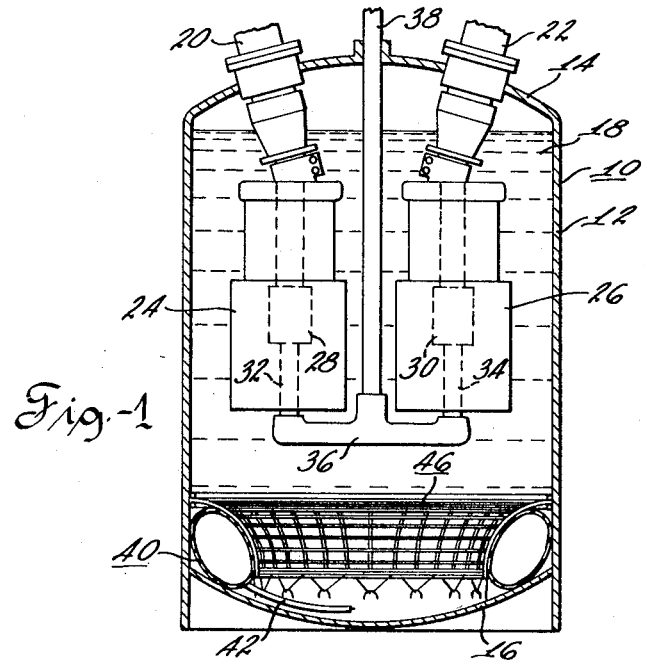
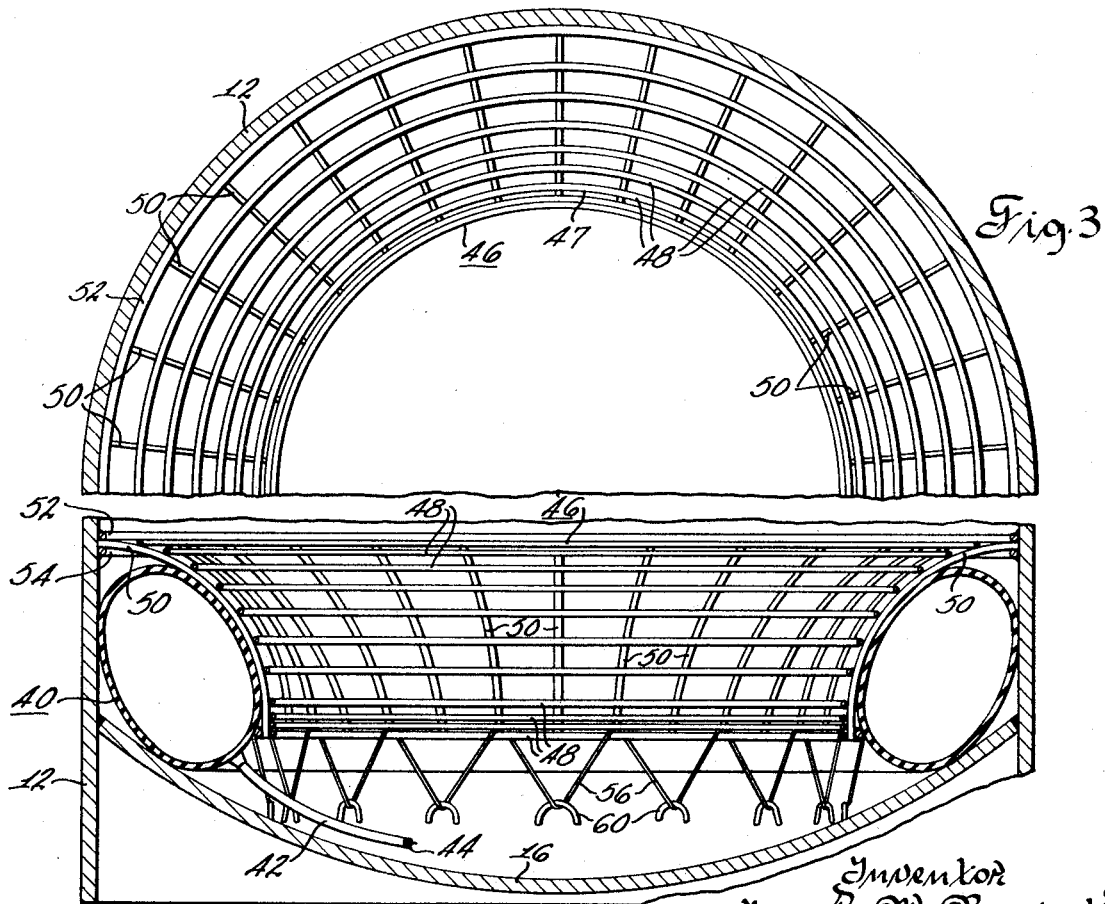

3,514,562
MEANS FOR SECURING PNEUMATIC SHOCK ABSORBER IN LIQUID FILLED ELECTRIC CIRCUIT BREAKER
Joseph M. Ramrath, Mattapan, Mass., assignor to Allis-Chalmers Manufacturing Company, Milwaukee, Wis.
Filed Nov. 7, 1967, Ser. No. 681,140
Int. Cl. H01h 33/68
U.S. Cl. 200—150     1 Claim

ABSTRACT OF THE DISCLOSURE

An oil filled high voltage, high current electric circuit breaker is provided with a compressible, gas filled shock absorbing means in the form of an annular torus which is located near the bottom of the circuit breaker tank. The shock absorbing means are restrained in position by retaining means in the form of a wire screen grid which overlies the shock absorbing means and is secured to the tank. Pressure forces generated in the oil during arcing are transmitted through the oil and through the restraining means directly against the shock absorber and are absorbed.

SUMMARY OF THE INVENTION

This invention relates to retaining means for securing pneumatic shock absorbers within a liquid filled electric circuit breaker.

When a circuit interrupting arc is established within the liquid (usually oil) inside, a liquid filled electric circuit breaker, the arc reacts with the liquid to generate a rapidly expanding gas bubble. This causes an immediate and substantial increase in the pressure of the liquid which persists until after extinguishment of the arc. In addition to the effect such pressure has on electrical phenomena within the breaker, there are also powerful shock waves which are transmitted through the liquid to the tank and thence to the tank supports which could be damaging. Heretofore, some shock absorbing devices which have been employed in circuit breakers have taken the form of spongelike liners for the tank walls (U.S. Pat. 2,998,499); air filled, metal walled gas cells located at the bottom of the tank (U.S. Pat. 2,734,973); or gas filled electric bodies immersed in the liquid inside circuit interrupting systems (U.S. Pat. 2,061,945). While such devices may have been satisfactory for their intended purposes, it is desirable to provide improved shock absorbers for liquid filled electric circuit breakers.

OBJECTS OF THE INVENTION

Accordingly, it is an object of the invention to provide improved shock absorber means for liquid filled electric circuit breakers.

Another object is to provide improved means for seeing pneumatic shock absorbers within a liquid filled electric circuit breaker.

Another object is to provide improved means of the aforesaid character which permit pneumatic shock absorber means located at the bottom of a circuit breaker tank to be impinged upon directly from above by a shock wave generated in the liquid in the breaker.

Another object is to provide means of the aforesaid character which comprise an improved pneumatic shock absorber and retaining means therefore which are very effective and reliable in operation and which are relatively economical to fabricate, install and service.

Other objects and advantages of the invention will hereinafter appear.

DESCRIPTION OF DRAWINGS

The accompanying drawing illustrates a preferred embodiment of the invention but it is to be understood that the embodiment illustrated is susceptible of modification with respect to details thereof without departing from the scope of the appended claims.

In the drawing:

FIG. 1 is a side elevational view, partly in section, of a liquid filled electric circuit breaker incorporating shock absorbing means in accordance with the present invention;

FIG. 2 is an enlarged view of a portion of FIG. 1; and

FIG. 3 is a top plan view of the portion shown in FIG. 2.

DESCRIPTION OF THE INVENTION

Referring to FIG. 1 of the drawing, there is shown a liquid filled high voltage electric circuit breaker incorporating shock absorbing means in accordance with the present invention. The circuit breaker comprises a tank 10 having a cylindrical side wall 12, a top wall or cover 14, and a bottom wall 16 and the tank is filled with an electrical insulating and arc extinguishing liquid 18, such as oil. A pair of terminal bushings 20 and 22 extend through cover 14 into the liquid 18 in tank 10 and have arc extinguishing units 24 and 26, respectively, connected to the lower ends thereof. The arc extinguishing units 24 and 26 have stationary electrical contacts 28 and 30, respectively, housed therein for cooperation with bayonet contacts 32 and 34, respectively, which are mounted on an electrically conductive cross head 36. Cross head 36 is mechanically connected to an insulated operating rod 38 which is reciprocably movable in a vertical direction to effect opening and closing of the two pairs of circuit breaker contacts 28–32 and 30–34.

Referring to FIGS. 1, 2 and 3, there is shown a pneumatic shock absorber means in accordance with the present invention which comprises a gas inflatable member 40 having, when inflated, the shape of an annular torus with a slightly elliptical cross sectional configuration, as FIGS. 1 and 3 show. Member 40 is fabricated, for example, of a fabric such as nylon to which a coating such as rubber is bonded. Member 40 is provided with a valve stem 42 having an inflation valve 44 therein. Member 40 is adapted to be compressed in response to a pressure increase in liquid 18 when arc interruption occurs in the units 24 and 26, as hereinafter explained.

Member 40 is disposed at the bottom of tank 10 and is restrained against its tendency to float to the surface of liquid 18 by a restraining means 46. Restraining means 46 comprises a perforated member 47 which takes the form of wire mesh screen comprised of a plurality of vertically stacked annular rings 48 of differing diameters and a plurality of staves 50 which are welded together at their contact points. Perforated member 47 has the general contour of that portion of member 40 with which it is most closely associated. Member 47 is rigidly secured around its upper outermost edge to cylindrical side wall 12 of tank 10 by means of entrapment of the upper ends of the staves 50 between a pair of rings 52 and 54 which are welded to the wall 12. Member 47 is further secured at its bottom innermost edge by means such as a nylon rope 56 which is looped around lower ring 48 and eyelets 60 which are rigidly secured to bottom wall 16 of tank 10. In a practical embodiment of the invention, member 40 is inflated to about seven pounds pressure and the spaces formed by the rings 48 and staves 50 average about two inches by two inches.

There are several advantages afforded by employing restraining means 46 of the type disclosed in conjunction with flexible, resilient, compressible shock absorber means 40. First, the gridlike, fully perforated configuration of restraining means 46 permits a maximum amount of the surface of shock absorber means 40 to be exposed to forces generated in the body of liquid 18 by arcing. Secondly, such forces are able to act through restraining means 46 directly in a short, straight path against the upper surface of shock absorber means 40 rather than merely on the lower surface. Thirdly, during compression, shock absorber means 40 is forced against the relatively smooth side wall 12 and bottom wall 16 of tank 10 thereby reducing the danger of puncturing or damaging the shock absorber means. Finally, the apparatus in accordance with the invention is relatively economical and easy to fabricate, install and service because of the relatively uncomplicated nature of the components employed.

The embodiments of the invention in which an exclusive property or privilege is claimed are defined as follows:

1. In a circuit interrupter comprising a tank containing a liquid and means for establishing a pressure generating arc in said liquid, in combination,
   inflated compressible shock absorbing means in the shape of an annular torus located near the bottom of said tank in said liquid,
   and restraining means comprising a perforated member overlying said shock absorbing means for holding said shock absorbing means in position,
   said restraining means being in the form of a wire mesh screen having the same general contour of that portion of said shock absorber with which it is most closely associated and having its outermost and innermost edges secured to said tank.

References Cited

UNITED STATES PATENTS 2,734,973   2/1956   MacNeill et al. _____ 200—150

FOREIGN PATENTS 1,203,659   8/1959   France.
626,525   2/1936   Germany.
252,625   10/1948   Switzerland.

ROBERT S. MACON, Primary Examiner